United States Patent Office 2,739,924
Patented Mar. 27, 1956

2,739,924

PRODUCTION OF TETRACYCLINE

Joseph Lein, Manlius, and Alexander Gourevitch, Syracuse, N. Y., assignors to Bristol Laboratories Inc., Syracuse, N. Y., a corporation of New York No Drawing. Application December 4, 1953, Serial No. 396,338

11 Claims. (Cl. 195—80)

This invention is concerned with the production of tetracycline by fermentation and more particularly relates to the production of tetracycline by submerged, aerobic fermentation of a chlortetracycline-producing species of streptomyces in the presence of an inhibitor of fermentative chlorination.

During the past few years a number of metabolic products of the growth of bacteria and fungi have been isolated and found to possess valuable therapeutic properties. Chlortetracycline, oxytetracycline and tetracycline have been particularly useful because of their broad spectrum of activity. Of these three, tetracycline is particularly useful because it gives better blood levels and fewer side-reactions and is more stable in alkaline media.

The preferred method of production of tetracycline is by aerobic submerged fermentation but isolation and purification of the product is rendered difficult and expensive in this method by the simultaneous production by the organism of chlortetracycline as well as tetracyline. Indeed, the former often predominates.

It is the object of this invention to provide an improved process for the production of tetracycline by fermentation.

It is a further object of this invention to provide a fermentation in which the yield of tetracycline is increased at the expense of that chlortetracycline which is normally produced.

It is a further object of this invention to provide a method for fermenting chlortetracycline-producing organisms in the presence of inhibitors of fermentative chlorination to produce broths containing tetracycline and substantially free of chlortetracycline.

The objects of the present invention have been attained and there is now discovered, according to the present invention, a process for the production of tetracycline which comprises growing a culture of a chlortetracycline-producing species of organism in the presence of an inhibitor of fermentative chlorination until substantial antibacterial activity is imparted to said solution.

One aspect of the present invention includes a process for the production of tetracycline which comprises growing under aerobic conditions a culture of a chlortetracycline-producing species of streptomyces in an aqueous, nitrogenous nutrient containing, carbohydrate solution under submerged aerobic conditions in the presence of an inhibitor of fermentative chlorination until substantial antibacterial activity is imparted to said solution.

Thus one of the more limited aspects of the present invention includes a process for the production of tetracycline which comprises growing under aerobic conditions a culture of a chlortetracycline-producing species of streptomyces in an aqueous, nitrogenous nutrient containing, carbohydrate solution under submerged aerobic conditions in the presence of added amounts of a member selected from the group consisting of bromide, iodide, and thiocyanate ions until substantial antibacterial activity is imparted to said solution.

Another even more specific embodiment of the present invention includes a process for the production of tetracycline which comprises growing under aerobic conditions a culture of a chlortetracycline-producing species of streptomyces in an aqueous, nitrogenous nutrient containing, carbohydrate solution under submerged aerobic conditions in the presence of from 0.01 to 5.0 percent by weight of the media of a bromide until substantial antibacterial activity is imparted to said solution.

Tetracycline is prepared by the cultivation under particular controlled conditions of many species of streptomyces, including *S. aureofaciens* (NRRL 2209) and a hitherto undescribed species of micro-organism which we have called Streptomyces BL 567201, now known as *S. viridifaciens*, which was isolated from a sample of soil. A culture of the living organism has been deposited in the American Type Culture Collection, Washington, D. C., and added to its permanent collection of microorganisms as A. T. C. C. 11989. The description of this organism is set forth in the following.

The organism *Streptomyces viridifaciens* sp. nov. which produces tetracycline belongs to the genus currently distinguished as streptomyces. Growth of this organism is good on glycerol asparagine beef extract agar at 30° C. On this medium mouse-gray aerial hyphae are formed and a yellowish-green pigment is secreted into the agar medium. The mycelium is composed of branched hyphae, the younger elements of which are gram-positive. Conidia are produced on aerial hyphae.

It is to be understood that for the production of tetracycline we do not wish to limit ourselves to these particular organisms or to organisms fully answering the above description which are given merely for illustrative purposes. We especially wish to include the use of organisms which are mutants produced from the described organism by mutating agents such as X-radiation, ultra-violet radiations, nitrogen mustards, etc.

The following is the diffusion plate assay method for determining the activity of tetracycline.

CULTURE MEDIUM

Streptomycin assay agar (with yeast extract) was purchased from the Baltimore Biological Laboratories, Baltimore, Maryland, and used as directed on the label. A suitable preparation may be made by suspending in one liter of distilled water to a final pH of 6.2 a mixture of 1.5 grams beef extract, 3 grams yeast extract, 6.0 grams peptone (e. g. Gelysate) and 15 grams agar. The suspension is allowed to stand for five minutes, mixed until a uniform suspension is obtained and heated gently with stirring. The suspension is boiled for one or two minutes or until solution has occurred. The culture medium is then dispensed and sterilized at 121° C. (fifteen pounds per square inch of steam pressure, gauge, for fifteen minutes).

INOCULUM

The test organism is *Bacillus subtilis* A. T. C. C. 6633. A spore suspension containing 50,000,000 viable spores per ml. is added to melted assay agar (cooled to 53° C.) to give a final inoculum of 2%.

PREPARATION OF PLATES

Twenty-one ml. of sterile assay agar are placed in level sterile Petri plates and allowed to solidify. Four ml. of inoculated agar are then distributed evenly over the surface of the base layer. Stainless steel templates containing a series of holes are placed on the medium after the latter has cooled to room temperature and samples are placed within the holes.

BUFFER

A citrate buffer at pH 6.2 is used for making dilutions.

This is prepared by mixing 192.12 g. of anhydrous citric acid with 106.3 grams sodium hydroxide in a liter of distilled water and diluting the mixture to one-tenth concentration with distilled water. The pH of the buffer must be checked potentiometrically, and, if necessary, adjusted to pH 6.2 by the addition of citric acid or sodium hydroxide. Variations in pH or concentration of the buffer affect the sizes of inhibition zones markedly. It has not been found necessary to sterilize the buffer. The stock solution is preserved with chloroform or toluene and fresh working solutions prepared daily.

ASSAY

Unknown samples are diluted, if required, in the pH 6.2 citrate buffer. Three holes on each plate are used to receive a single dilution of the sample. Following incubation at 32° C. the diameters of the zones are measured and averaged.

*Streptomyces viridifaciens* was differentiated from a strain of *S. aureofaciens* (NRRL 2209) obtained from the Northern Regional Research Laboratory, Peoria, Illinois, where it had been deposited as an authentic Aureomycin-producing strain, by observation of growth characteristic on glycerol asparagine beef extract agar and Czapek-Dox agar containing 1% dextrin.

GLYCEROL ASPARAGINE BEEF EXTRACT AGAR

| | Percent |
|---|---|
| Glycerol | 1 |
| Asparagine | 0.05 |
| Beef extract | 0.2 |
| $K_2HPO_4$ | 0.05 |
| Agar | 1.5 | pH 7.2

| | BL 567201 | *Streptomyces aureofaciens* |
|---|---|---|
| Growth | Good | Good. |
| Sporulation | do | Do. |
| Diffusible pigment | Yellowish-green | None. |
| Spiral formation | Abundant, loosely wound | Do. |
| Aerial hyphae | Mouse-gray | Rose-Gray. |
| Reverse | Brown | Olive-drab. |

DEXTRIN CZAPEK-DOX

| | Percent |
|---|---|
| $NaNO_3$ | 0.2 |
| $K_2HPO_4$ | 0.1 |
| $MgSO_4$ | 0.05 |
| KCl | 0.05 |
| $FeSO_4$ | trace |
| Agar | 1.5 | pH 7.2

| | BL 567201 | *Streptomyces aureofaciens* |
|---|---|---|
| Growth | Fair to good | Fair. |
| Sporulation | Good | Poor. |
| Diffusible pigment | None | None. |
| Spiral formation | Abundant, loosely-wound | Sparse, very loosely-wound. |
| Aerial hyphae | Mouse-gray | Buff to gray. |
| Reverse | Light brown | Buff to tan. |

*Streptomyces viridifaciens* is further characterized by production of an intense bluish-green pigment when grown in submerged culture in a medium containing 1% sucrose, 1% soy bean meal, 1% soy peptone, 1.5% $KH_2PO_4$, and 0.5% $(NH_4)_2HPO_4$. *Streptomyces aureofaciens* (NRRL 2209) does not produce this pigment.

This invention embraces a process for growing chlor- tetracycline-producing species of Streptomyces at about 24°–30° C. under submerged conditions of agitation and aeration on media consisting of a source of carbon, a source of nitrogen, a source of growth substances, mineral salts such as potassium phosphate, magnesium sulfate, and sodium nitrate, and when desired, a buffering agent such as calcium carbonate, with the addition to the media of a metabolic inhibitor of fermentative chlorination. Such metabolic inhibitors of chlorination include bromide, iodide, and thiocyanate ions. These are added to the media in the form of their compounds, such as alkali metal or alkaline earth metal salts. The preferred inhibitor is bromide ion; it is conveniently added as sodium bromide, potassium bromide, calcium bromide, ammonium bromide or hydrobromic acid. In terms of sodium bromide, useful amounts lie in the range of 0.01 to 5.0 percent by weight of the media; about 0.1 to 2.0 percent is preferred.

It is theorized, but not certain, that the inhibition of fermentative chlorination demonstrated by this invention may be produced by interference with enzymatic processes and perhaps by the process commonly referred to as "competitive inhibition." However, this invention is not dependent upon, nor restricted to, any such theory.

As a source of carbon in the nutrient medium one of the following is used:

| | |
|---|---|
| Ordinary starch | Xylose |
| Soluble starch | Arabinose |
| Sucrose | Rhamnose |
| Glucose | Fructose |
| Maltose | Lactose |
| Dextrose | Inulin |
| Glycerol | Dextrins |
| Galactose | |

These carbon sources are supplied to the medium in purified form or in the form of concentrates. The amount of such carbon sources for best antibiotic production in the medium varies considerably, from about ½% to 5%, by weight of the total weight of the fermentation medium.

Suitable sources of nitrogen, including some sources of growth substances, for the fermentation process include a wide variety of substances such as:

| | |
|---|---|
| Amino acids | Wheat-steeping liquor |
| Casein, both hydrolyzed and unhydrolyzed | Whey or whey concentrates |
| | Acid hydrolyzed corn gluten |
| Fish meal | Acid hydrolyzed wheat gluten |
| Soy bean meal | |
| Meat extracts | Peptone |
| Liver cake | Offals |
| Urea | Brewers yeast |
| Nitrates | Cottonseed meal |
| Ammonium compounds | Lactalbumin |
| Distillers grain slop | Tryptone |
| Corn-steeping liquor | |

These proteinaceous ingredients need not be applied in a high degree of purity; the less pure materials which carry traces of growth factors and considerable quantities of mineral nutrients are suitable for use. It is not possible, of course, because of the crude nature of many of these nitrogenous substances to specify definite proportions of the material to be added. An amount of about 0.1% to 5.0% by weight on a solid basis describes the useful range of nitrogenous substances to be added to the media in most cases.

The pH of the fermentation medium should be 6.0–6.2 at the start of the fermentation. The preferred temperature of the fermentation process is about 26°–28° C. The maximum yield of product is usually obtained within 1–3 days, varying with the method of cultivating the Streptomyces.

*Example 1*

For the production of tetracycline, an inoculum is prepared in a fermentation medium containing, by weight, 1% Corn steep
1% Sucrose
0.5% (NH4)2HPO4
1.5% KH2PO4
0.2% MgSO4·7H2O
0.5% NaBr
pH 6.2–6.4 made up in a volume of 2500 ml. and introduced into a 2½ gallon bottle. The medium is sterilized with steam at 118°–120° for one hour. When cool, the medium is inoculated with about 0.5%, by volume, of a turbid, aqueous spore suspension of the Streptomyces from an agar slant. The contents of the bottle are then incubated at 26°–28° C. for 48 hours on a reciprocating-type shaker and sterile air blown over the surface of the liquid. From the inoculum bottle the broth containing the *Streptomyces sp.* is transferred into the tank fermenter under completely aseptic conditions. When desired, the liquor may be processed as described below and the tetracycline isolated.

The tetracycline produced by *Streptomyces viridifaciens*, *Streptomyces aureofaciens* (NRRL 2209), and other tetracycline-producing species of Streptomyces may be prepared on a large scale by submerged or deep culture. Stationary vat fermenters equipped with suitable agitation and aeration have been found to be useful for this purpose. A nutrient medium consisting of 56.8 liters of corn steep, 56.8 kg. sucrose, 28.4 kg. (NH4)2HPO4, 85.2 kg. KH2PO4, 11.3 kg. MgSO4·7 H2O, 28.4 kg. NaBr, and water to make 1500 gallons is suitable. This medium may be prepared in a 2000 gallon glass-lined fermenter equipped with a water-jacket for temperature control, a suitable stainless steel agitator and a suitable sparging device for aeration. The medium is sterilized by heating with steam under pressure and is then cooled. After sterilization the hydrogen ion concentration of the medium should be approximately pH 6.2. The nutrient medium is inoculated with 15%, by volume, of a vegetative culture grown either in a similar type fermenter previously inoculated with an inoculum described earlier or with an inoculum prepared in the laboratory. The culture in the 2000 gallon fermenter is incubated at a temperature of 83° F. for about 44 hours. During the incubation the impeller is revoleved at the rate of 90 R. P. M. and sterile air is introduced into the medium through the sparger at the rate of 100 cubic feet per minute. At the end of the incubation period the culture fluid normally contains a substantial amount of tetracycline which exceeds the amount of chlortetracyline present. The tetracycline is isolated as described below; the solids obtained before recrystallization contain at least nineteen parts tetracycline for every part of chlortetracycline.

*Example II*

Fermentation liquor containing tetracycline, and no more than one part chlortetracycline per two parts tetracycline, is produced by following the procedure of Example I, using the following culture medium.

1% Wheat gluten
1% Glycerol
0.05 Distiller's solubles
0.1% CaCO3
0.5% NaBr

*Example III*

Fermentation liquor containing tetracycline, and no more than one part chlortetracycline per two parts tetracycline, is produced by following the procedure of Example I, using the following culture medium.

1% Cottonseed meal
1% Glucose
0.05% Distiller's solubles
0.1% CaCO3
0.5% NaBr

*Example IV*

Fermentation liquor containing tetracycline, and no more than one part chlortetracycline per two parts tetracycline, is produced by following the procedure of Example I, using the following culture medium.

1% Corn steep liquor
1% Cerelose
0.1% CaCO3
1.0% NaBr

*Example V*

Fermentation liquor containing tetracycline, and no more than one part chlortetracycline per two parts tetracycline, is produced by following the procedure of Example I, using the following culture medium.

1% Soy bean meal
1% Cerelose
0.05% Yeast extract
0.1% CaCO3
0.1% NaBr

*Example VI*

Fermentation liquor containing tetracycline, and no more than one part chlortetracycline per two parts tetracycline, is produced by following the procedure of Example I, using the following culture medium.

3% Soy bean meal
0.5% Corn starch
0.1% N-Z-Amine B (enzymatic digest of casein)
0.3% NaNO3
0.5% CaCO3
0.5% KBr

*Example VII*

Fermentation liquor containing tetracycline, and no more than one part chlortetracycline per two parts tetracycline, is produced by following the procedure of Example I, using the following culture medium.

1% N-Z-Amine B
1% Cerelose
0.5% Yeast extract
0.1% CaCO3
0.5% CaBr2

*Example VIII*

Fermentation liquor containing tetracycline, and no more than one part chlortetracycline per two parts tetracycline, is produced by following the procedure of Example I, using the following culture medium.

1% Sucrose
1% Soy bean meal
1% Soy peptone
1.5% KH2PO4
0.5% (NH4)2HPO4
0.5% NaBr

*Example IX*

The procedure of Example I was carried out both with and without 0.5% sodium bromide under otherwise comparable conditions using *streptomyces viridifaciens*; the amounts of tetracycline and chlortetracycline in the resulting broths were determined by paper-strip chromatography using system D, as described below, or by differential bio-assay on pH 6.2 and 8.0 agar.

The broth from a 120-gallon tank containing 80 gallons media, including 0.5% sodium bromide, after 20 and 44 hours fermentation contained least nineteen parts tetracycline per part of chlortetracycline. By bio-assay after 20 hours, the broth contained 85 mcg./ml. tetracycline and 3 mcg./ml. chlortetracycline.

The broth from a 120-gallon tank containing 80 gallons media, containing no added bromide ion, after 44 hours fermentation contained no more than one to two parts tetracycline per eight parts chlortetracycline.

The broth from a 600-gallon tank containing 350 galions media, containing no added bromide ion, after 45 hours of fermentation contained no more than one to two parts tetracycline per eight parts chlortetracycline.

The broth from another 600-gallon tank containing 300 gallons media, containing no added bromide ion, after 30 hours fermentation contained no more than one part tetracycline per nine parts chlortetracycline.

*Example X*

The various media tabulated below were prepared in 200 ml. quantities per one liter Erlenmeyer flask in duplicate, autoclaved 15 minutes at 15 pounds, cooled and inoculated with a 24 hour vegative inoculum of *Streptomyces viridifaciens* developed in corn-steep medium at the rate of 1 ml. inoculum/200 ml. medium. The inoculated flasks were agitated on a reciprocating shaker at 28° C. for 48 hours and harvested for assay.

The harvested broths were centrifuged and assayed by paper-strip chromatography using system D.

MEDIA AND ASSAY RESULTS

|  | Run Number | | | | |
|---|---|---|---|---|---|
|  | 1 | 2 | 3 | 4 | 5 |
| Sucrose, percent | 1 | 1 | 1 | 1 | 1 |
| $KH_2PO_4$, percent | 1.5 | 1.5 | 1.5 | 1.5 | 1.5 |
| $(NH_4)_2HPO_4$, percent | 0.5 | 0.5 | 0.5 | 0.5 | 0.5 |
| $MgSO_4$, percent | 0.2 | 0.2 | 0.2 | 0.2 | 0.2 |
| Corn steep, percent | 1 | 1 | 1 | 1 | 1 |
| NaBr, percent | 0 | 0.5 | 1 | 0.5 | 1.0 |
| Harvest pH | 5.4 | 5.3 | | | |
| Chlortetracycline, percent | 100 | 10 | 95 | <5 | <5 |
| Tetracycline, percent | 0 | 90 | 5 | >95 | >95 |

Run 2 contained about 100 mcg./ml. of tetracycline.

*Example XI*

The NaBr of Example X is replaced in turn by KBr, $CaBr_2$, $NH_4Br$, KI (less than 0.5%), or NaSCN to demonstrate the same increased production of tetracycline at the expense of chlortetracycline.

*Example XII*

When using *Streptomyces aureofaciens* (NRRL–2209), the addition of bromide, iodide, or thiocyanate ions to the media as in Example X is found to increase production of tetracycline at the expense of chlortetracycline, particularly when the media is altered to suit the strain and to facilitate maximum antibotic production (e. g. see U. S. Patent 2,482,055).

After fermentation has been completed, tetracycline is recovered from the broth, for example, by filtering to remove the mycelium, stirring the broth (preferably at about pH 8.5) with butanol or methyl isobutyl ketone, separating the solvent layer containing the tetracycline, concentrating it to small volume by distillation, and mixing it with a lower hydrocarbon, e. g., Skellysolve C, to precipitate solid tetracycline as the base, if the extracted broth was at alkaline pH and as the hydrochloride if, for example, the broth had been acidified before extraction with hydrochloric acid. The solid tetracycline so produced may be further purified by slurrying into ammonium hydroxide and also by adsorption from a solution of the free base onto a chromatographic adsorbent (e. g. a silica such as Florisil), followed by washing (e. g. acetone or methanol) to remove impurities and then elution with an acid. The purified tetracycline acid salt in the eluate is then recovered by crystallization, precipitation, lyophilization, or the like.

Various salts of tetracycline may be prepared, most simply by adding the desired acid, mineral or organic, to the antibiotic in water until a clear solution is obtained. The solid salts may be prepared by adjusting the pH of such a solution of a tetracycline salt to a point just below that at which the antibiotic would begin to separate. The solution may then be dried, as by subjecting the frozen solution to a vacuum. Acid salts of tetracycline are obtained by evaporation of a solution of the salt in water at a low pH. Mineral acids which may be used are hydrochloric acid, sulfuric acid, and phosphoric acid. Organic acids which may be used are citric acid, tartaric acid, gluconic acid, and so forth. Since tetracycline is amphoteric salts of various metallic elements with the antibiotic, may be prepared, in particular, the alkali metal salts of tetracycline are formed by treating an aqueous suspension of the antibiotic with an alkaline hydroxide. The solid metal salts of tetracycline are obtained by the evaporation under vacuum of an aqueous solution of the antibiotic at the proper pH.

The tetracycline produced in the above procedures is conclusively characterized, even when contaminated by similar organic chemicals, by its "spectrum" of activity (i. e. degree of migration or $R_f$ values) using a series of solvents in the procedure known as paper strip chromatography. This technique is a relatively new but already well-established procedure for the identification of organic compounds; as with infra-red maxima the $R_f$ values in a series of solvent systems are a unique and reproducible characteristic of a given chemical and serve as a "fingerprint."

The procedure used is as follows. Strips of ash-free, dense, highly retentive filter paper (e. g. 589 Blue Ribbon Special from Carl Schleicher and Schnell Co., Keene, N. H.), one-half inch wide and 58 cm. long, are suspended at constant room temperature is a protected area (i. e. in a large jar) from the edge of a dish. The top of the strip is in contact with a supply of the solvent system (also called developing phase) in the dish; the bottom of the strip hangs free and does not reach the supply of solvent system (or volatile components thereof) placed below the hanging strips to facilitate saturation of the air with the solvent in use.

The product to be examined (i. e., in a fermentation broth or as an isolated solid) is placed on a marked spot at the top of this portion of the strip which hangs free in the air. In the case of a solid, it is dissolved in any useful solvent. The amounts used are those giving a convenient zone size on final assay as determined by simple trial. For example, a useful amount is 5 microliters (0.005 ml.) of a solution containing 1 mgm./ml. solvent of tetracycline for assay vs. *B. subtilis*. The strip is dried and then placed in position in the dish, which contains the selected solvent system. The solvent is allowed to migrate downward, that is, to develop the strip, until the solvent front reaches the bottom of the strip. This requires about fifteen hours; the surrounding atmosphere is maintained at a constant temperature free from drafts and saturated with solvent vapor from a pool below.

The strip is then removed, air-dried, and placed on a tray of agar of controlled pH (here 6.2) inoculated with a test organism, in this case *B. subtilis*. After standing in the refrigerator overnight, the strips are removed, and the trays are marked for identification, incubated overnight and either read directly or photographed to give a permanent record.

The outline of the whole strip is visible. The location of each antibiotic agent on the strip is marked by a clear area, which contrasts with the turbid area where the organism has grown. The strip as shown on the photograph is marked off into zones representing 5, 10, 10, 10, 10, 10, 10, 10, 10, and 15 percent of the distance from the point of sample application to the bottom, respectively, and these zones are described as having $R_f$ values of 1 to 10 inclusive. A small spot in the exact center would thus have $R_f6$, while a larger spot would extend into the adjacent zones and have $R_f5$, 6, 7 as the entire zone is counted.

Using this technique, the $R_f$ spectra of tetracycline is found to be as follows, using 5 microliters of a 1 mgm./ml.

solution as a sample and assaying with *B. subtilis* in pH 6.2 agar, in the twelve solvent systems:

| Solvent System | A | B | C | D | E | F | G | H | I | J | K | L |
|---|---|---|---|---|---|---|---|---|---|---|---|---|
| $R_f$ value | 6,7 | 5,6 | 4,5 | 4,5,6 | 1 | 8,9,10 | 6,7 | 8 | 5 | 9,10 | 6,7,8 | 3,4,5 |

The composition of these solvent systems is as follows:
A—Water
B—10% aqueous sodium citrate
C—40% aqueous sodium citrate
D—Butanol saturated with water
E—Dry methyl isobutyl ketone
F—A mixture of 100 parts of 80% methanol and 10.5 parts piperidine adjusted to pH 9.5 with acetic acid
G—A mixture by volume of 80 parts methanol, 5 parts glacial acetic acid and 15 parts water
H—Butanol saturated with water and containing 2% p-toluenesulfonic acid
I—A mixture of 100 mls. of butanol saturated with water and 5 ml. glacial acetic acid
J—Butanol saturated with water and containing 2% p-toluenesulfonic acid plus 2% piperidine
K—100 parts of butanol saturated with water and 2 grams p-toluenesulfonic acid plus 2 mls. piperidine plus 2 grams lauric acid
L—A mixture of two parts isoamyl alcohol and one part carbon tetrachloride, saturated with 10% aqueous sodium citrate. In this case, before applying the sample, the strips are saturated with 10% aqueous sodium citrate adjusted to pH 5.7 with citric acid and dried.

The properties of tetracycline are described in the Journal of the American Chemical Society, volume 75, pages 4621–23, 1953.

Thus a sample of "tetracycline" free base was prepared according to the literature from chlortetracycline and found to melt at 170°–175° C. and to contain 0.71 percent chlorine, indicating a contamination with about 10 percent unreacted chlortetracycline. This sample was shown to be identical with a sample of tetracycline produced by fermentation, and all impurities were distinguished, by examination of these samples and samples of chlortetracycline and oxytetracycline, both alone and as mixtures, by paper strip chromatography (particularly using solvent systems D and L).

Tetracycline lost about 28% of its activity in 48 hours in pH 8.0 buffer at 37° C. at about 0.7 mgm./ml.; chlortetracycline lost about 50% of its activity in 14 hours and oxytetracycline lost about 50% of its activity in 26 hours under the same conditions.

In addition, tetracycline is clearly differentiated from chlortetracycline and oxytetracycline by assay on pH 8.0 agar, on which chlortetracycline and oxytetracycline appear much less active than tetracycline, and simultaneous assay on pH 6.2 agar.

Tetracycline may thus be purified of contaminating amounts of chlortetracycline or oxytetracycline by maintaining an aqueous solution at about pH 8.0 until all the chlortetracycline or oxytetracycline is decomposed and then isolating purified tetracycline. Such an operation is greatly facilitated by a process, such as that of the present invention, which holds the amount of chlortetracycline present down to a minimum.

We claim:

1. A process for the production of tetracycline which comprises growing under aerobic conditions a culture of a chlortetracycline-producing species of Streptomyces selected from the group consisting of *Streptomyces viridifaciens* and *Streptomyces aureofaciens* in an aqueous, nitrogenous nutrient containing, carbohydrate solution containing a substantial amount of chloride ion under submerged aerobic conditions in the presence of added amounts of about 0.01 to 5.0 per cent by weight of the medium of a member selected from the group consisting of bromide, iodide, and thiocyanate ions until substantial antibacterial activity caused primarily by the presence of tetracycline is imparted to said solution.

2. A process for the production of tetracycline which comprises growing under aerobic conditions a culture of a chlortetracycline-producing species of Streptomyces selected from the group consisting of *Streptomyces viridifaciens* and *Streptomyces aureofaciens* in an aqueous, nitrogenous nutrient containing, carbohydrate solution containing a substantial amount of chloride ion under submerged aerobic conditions in the presence of from 0.01 to 5.0 per cent by weight of the medium of a bromide until substantial antibacterial activity caused primarily by the presence of tetracycline is imparted to said solution.

3. A process for the production of tetracycline which comprises growing under aerobic conditions a culture of a chlortetracycline-producing species of Stretpomyces selected from the group consisting of *Streptomyces viridifaciens* and *Streptomyces aureofaciens* in an aqueous, nitrogenous nutrient containing, carbohydrate solution containing a substantial amount of chloride ion under submerged aerobic conditions in the presence of from 0.01 to 5.0 percent by weight of the medium of an alkali metal bromide until substantial antibacterial activity caused primarily by the presence of tetracycline is imparted to said solution.

4. A process for the production of tetracycline which comprises growing under aerobic conditions a culture of a chlortetracycline-producing species of Streptomyces selected from the group consisting of *Streptomyces viridifaciens* and *Streptomyces aureofaciens* in an aqueous, nitrogenous nutrient containing, carbohydrate solution containing a substantial amount of chloride ion under submerged aerobic conditions in the presence of from 0.01 to 5.0 percent by weight of the medium of an alkaline earth metal bromide until substantial antibacterial activity caused primarily by the presence of tetracycline is imparted to said solution.

5. A process for production of tetracycline which comprises growing under aerobic conditions a culture of a chlortetracycline-producing species of Streptomyces selected from the group consisting of *Streptomyces viridifaciens* and *Streptomyces aureofaciens* in an aqueous, nitrogenous nutrient containing, carbohydrate solution containing a substantial amount of chloride ion under submerged aerobic conditions in the presence of from 0.01 to 5.0 percent by weight of the medium of sodium bromide until substantial antibacterial activity caused primarily by the presence of tetracycline is imparted to said solution.

6. A process for the production of tetracycline which comprises growing under aerobic conditions a culture of a chlortetracycline-producing species of Streptomyces selected from the group consisting of *Streptomyces viridifaciens* and *Streptomyces aureofaciens* in an aqueous, nitrogenous nutrient containing, carbohydrate solution containing a substantial amount of chloride ion under submerged aerobic conditions in the presence of from 0.01 to 5.0 percent by weight of the medium of potassium bromide until substantial antibacterial activity caused primarily by the presence of tetracycline is imparted to said solution.

7. A process for the production of tetracycline which comprises growing under aerobic conditions a culture of a chlortetracycline-producing species of Streptomyces selected from the group consisting of *Streptomyces viridifaciens* and *Streptomyces aureofaciens* in an aqueous, nitrogenous nutrient containing, carbohydrate solution containing a substantial amount of chloride ion under submerged aerobic conditions in the presence of from 0.01 to 0.5 percent by weight of the medium of hydrogen bromide until substantial antibacterial activity caused primarily by the presence of tetracycline is imparted to said solution.

8. A process for the production of tetracycline which comprises growing under aerobic conditions a culture of a chlortetracycline-producing species of Streptomyces selected from the group consisting of *Streptomyces viridifaciens* and *Streptomyces aureofaciens* in an aqueous, nitrogenous nutrient containing, carbohydrate solution containing a substantial amount of chloride ion under submerged aerobic conditions in the presence of from 0.01 to 5.0 percent by weight of the medium of calcium bromide until substantial antibacterial activity caused primarily by the presence of tetracycline is imparted to said solution.

9. A process for the production of tetracycline which comprises growing under aerobic conditions a culture of a chlortetracycline-producing species of Streptomyces selected from the group consisting of *Streptomyces viridifaciens* and *Streptomyces aureofaciens* in an aqueous, nitrogenous nutrient containing, carbohydrate solution containing a substantial amount of chloride ion under submerged aerobic conditions in the presence of from 0.01 to 5.0 percent by weight of the medium of ammonium bromide until substantial antibacterial activity caused primarily by the presence of tetracycline is imparted to said solution.

10. A process for the production of tetracycline which comprises growing under aerobic conditions a culture of *Streptomyces aureofaciens* in an aqueous, nitrogenous nutrient containing, carbohydrate solution containing a substantial amount of chloride ion under submerged aerobic conditions in the presence of from 0.1 to 2.0 percent by weight of the medium of a bromide until substantial antibacterial activity caused primarily by the presence of tetracycline is imparted to said solution.

11. A process for the production of tetracycline which comprises growing under aerobic conditions a culture of *Streptomyces viridifaciens* in an aqueous, nitrogenous nutrient containing, carbohydrate solution containing a substantial amount of chloride ion under submerged aerobic conditions in the presence of from 0.1 to 2.0 per cent by weight of the medium of a bromide until substantial antibacterial activity caused primarily by the presence of tetracycline is imparted to said solution.

References Cited in the file of this patent

UNITED STATES PATENTS

| | | |
|---|---|---|
| 2,482,055 | Duggar | Sept. 13, 1949 |
| 2,516,080 | Sobin et al. | July 18, 1950 |
| 2,609,329 | Niedercorn | Sept. 2, 1952 |
| 2,650,896 | McDaniel | Sept. 1, 1953 |

OTHER REFERENCES

Porter: Bacterial Chemistry and Physiology, Wiley, page 625.

J. A. C. S., 71, October 5, 1952, pages 4976, 4977.

J. A. C. S., 75, September 20, 1953, page 4621.